United States Patent [19]

Wang

[11] Patent Number: 5,525,950
[45] Date of Patent: Jun. 11, 1996

[54] MAGNETIC BASE

[76] Inventor: Chin-Yuan Wang, P.O. Box No. 2103, Taichung City, Taiwan

[21] Appl. No.: 514,030
[22] Filed: Aug. 11, 1995
[51] Int. Cl.⁶ .................................................. B25B 11/00
[52] U.S. Cl. ............................................................ 335/288
[58] Field of Search .................................... 335/285, 286, 335/287, 288, 295; 269/8; 294/65.5, 88

Primary Examiner—Leo P. Picard
Assistant Examiner—Raymond M. Barrera

[57] ABSTRACT

A magnetic base including a rotary magnetic element, two symmetrical magnetic plate assemblies covered around the rotary magnetic element, and two non-magnetic blocks connected between the magnetic plate assemblies at different elevations; in which, each magnetic plate assembly consists of a stack of iron plates, each iron plate having two notches at one side near two opposite ends, and a flange at each notch; each non non-magnetic block has two opposite projecting portions respectively fitted into the respective notches of the iron plates and engaged with the respective flanges.

7 Claims, 3 Drawing Sheets

MAGNETIC BASE

BACKGROUND OF THE INVENTION

The present invention relates to magnetic bases, and relates more particularly to such a magnetic base which comprises a rotary magnetic element, two symmetrical stacks of iron plates covered around tile rotary magnetic element, and two non-magnetic blocks connected between the two stacks of iron plates at different elevations.

FIGS. 1 and 2 show a conventional magnetic base which is comprised of rotary magnetic element 12 turned by a rotary knob, two symmetrical iron blocks 11 covered around the rotary magnetic element 12, two non-magnetic blocks 13 connected between the iron blocks 11 at different elevations. The magnetic flux between the bottom side 15 of the magnetic base and the attracted object 16 is controlled by turning the rotary magnetic element 12. Because the iron blocks 11 are con, only made by forging or milling, when the inside of the iron blocks 11 are magnetically conducted, the magnetic lines of force may be not perpendicular to the axis about which the rotary magnetic element is turned, causing the intensity of the effective magnetic force reduced. Furthermore, because the magnetic field in the magnetic base is irregular, a bow wave loss of the magnetic field tends to occur, causing the force of magnetic attraction weakened.

SUMMARY OF THE INVENTION

According to one aspect of the present invention, the magnetic base comprises a rotary magnetic element, two symmetrical magnetic plate assemblies covered around the rotary magnetic element, and two non-magnetic blocks connected between the magnetic plate assemblies at different elevations, wherein each magnetic plate assembly is comprised of a stack of iron plates of the same geometric shape disposed perpendicular to the axis about which the rotary magnetic element is turned. Therefore, non magnetic flux will be produced in parallel with the rotation axis, the effective magnetic force is reinforced, and the bow wave loss of the magnetic field is minimized.

According to another aspect of the present invention, the iron plates of the magnetic plate assembly each has two notches at one side near two opposite ends, and a flange at each notch; the non-nonmagnetic blocks each has two opposite projecting portions respectively fitted into the respective notches of the iron plates and engaged with the respective flanges. Therefore, when the magnetic base is assembled, the component parts of the magnetic base are firmly retained together.

According to still another object of the present invention, the specification of the magnetic base can be conveniently changed by changing the number or thickness of the iron plates of the magnetic plate assemblies.

DETAILED DESCRIPTION OF THE PREFERRED EMBODIMENTS

Figure 1:
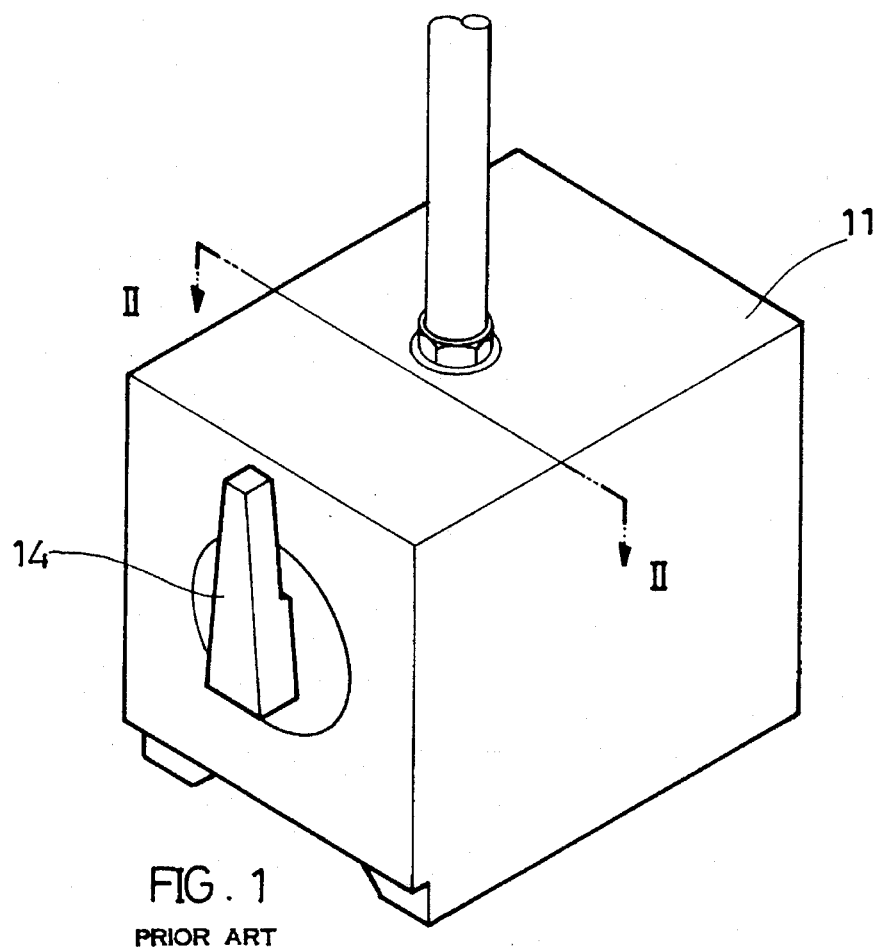
FIG. 1 is an elevational view of a magnetic base according to the prior art.
Figure 2:
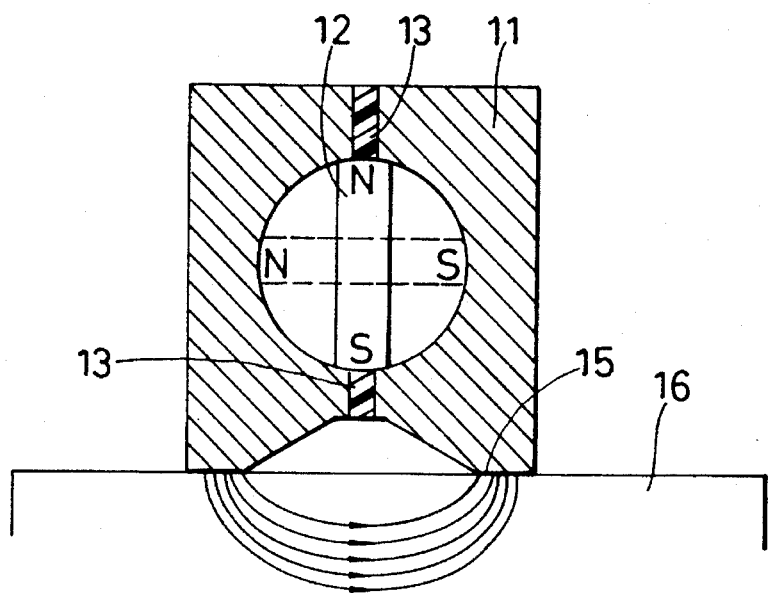
FIG. 2 is a sectional view taken along line, II—II of FIG. 1.
Figure 3:
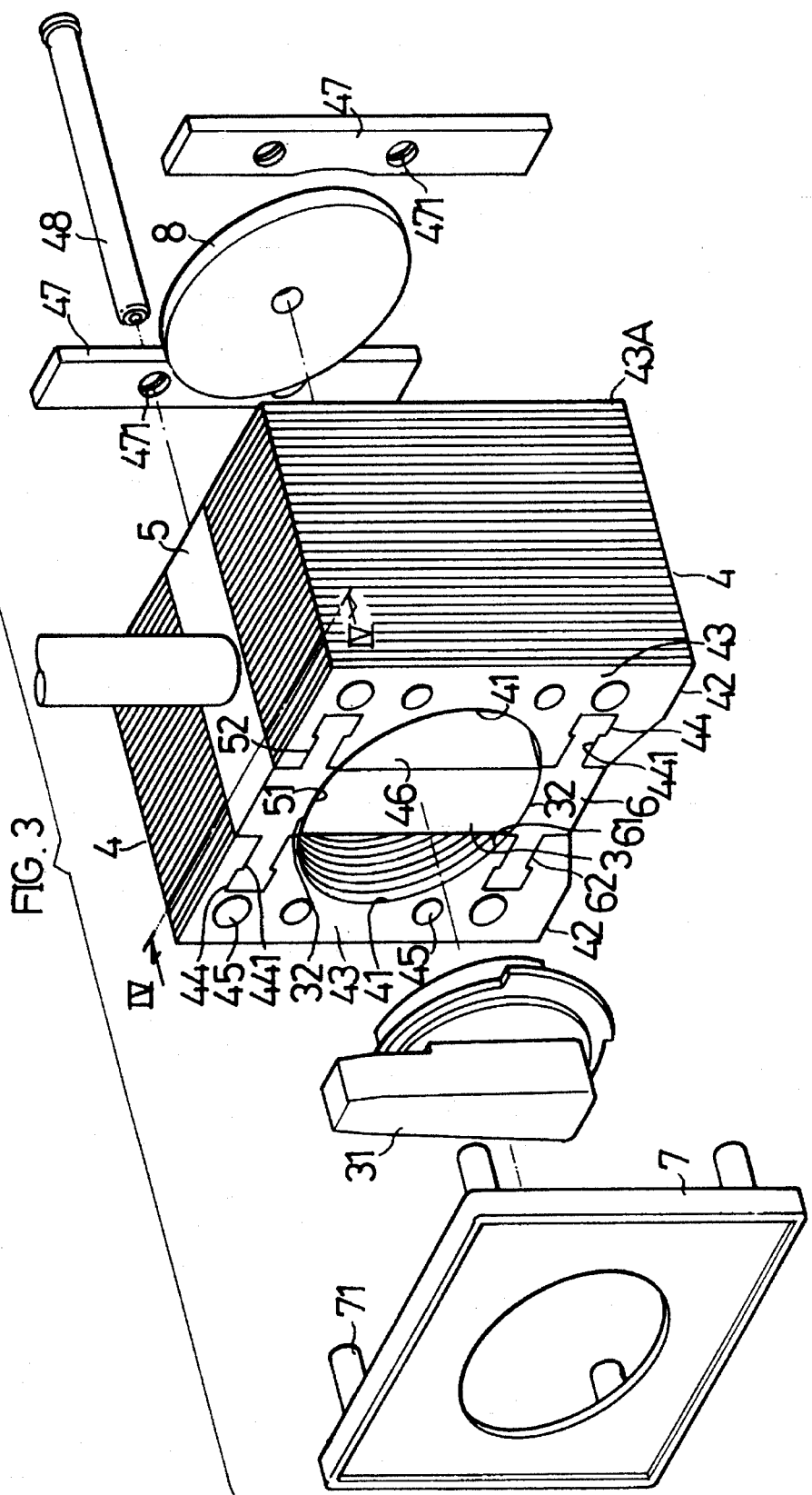
FIG. 3 is an exploded view of a magnetic base according to the present invention.
Figure 4:
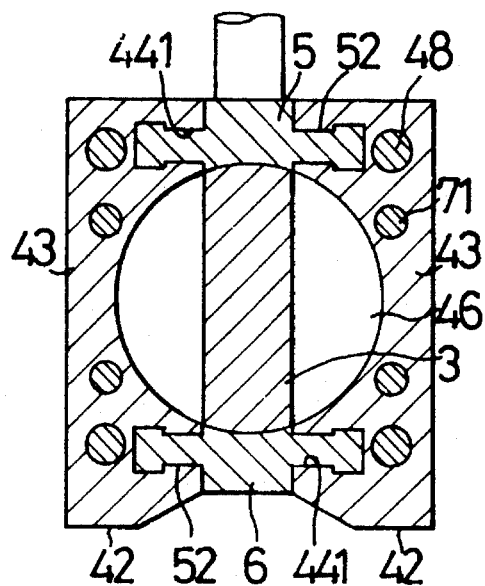
FIG. 4 is a sectional view taken along line IV—IV of FIG. 3.

Referring to FIGS. 3 and 4, a magnetic base in accordance with the present invention comprises a trapezoidal magnetic element 3 that can be turned by a rotary knob 31. The trapezoidal magnetic element 3 has two opposite arched ends 32 covered by two symmetrical magnetic plate assemblies 4 and two opposite non-magnetic blocks 5 and 6. Each magnetic plate assembly 4 has a circularly arched inner side 41 and a downwardly protruded contact portion 42 at the bottom. The non-magnetic blocks 5 and 6 are connected between the two magnetic plate assemblies 4 at different elevations. Therefore, the magnetic flux between the contact portion 42 and the attracted object can be connected or disconnected by turning the trapezoidal magnetic element 3 between the non-magnetic blocks 5 and 6. Each magnetic plate assembly 4 is comprised of a stack of iron plates 43 disposed perpendicular to the rotary shaft of the trapezoidal magnetic element 3. Each iron plate 43 comprises two notches 44 at one side near two opposite ends, a flange 441 at one end of each notch 44, and a plurality of locating holes 45. Two locating plates 47 of thickness thicker than the iron plates 43 are respectively fastened to the back sides 43A of the magnetic plate assemblies 4, each locating plate 47 laving a plurality of countersunk holes 471 respectively fastened to the locating holes 45 of the respective magnetic plate assembly 4 by a respective headed pin 48. Each non-magnetic block 5 or 6 has a circularly arched inner side 51 or 61, two opposite projecting portions 52 or 62 respectively fitted into the respective notches 44 of the magnetic plate assemblies 4 and engaged with the flanges 441. When assembled, the circularly arched inner sides 51 and 61 of the non-magnetic blocks 5 and 6 and the circularly arched inner sides 41 of the magnetic plate assemblies 4 define a cylindrical chamber 46, which holds the trapezoidal magnetic element 3. A front cover plate 7 and a rear cover plate 8 are fastened to the front and back sides of the magnetic plate assemblies 4. The front cover plate 7 has a plurality of locating rods 71 perpendicularly raised from the back side and respectively fastened to the locating holes 45 of the magnetic plate assemblies 4. The back cover plate 8 is made of circular shape adhered to the back side 43A of the magnetic plate assemblies 4 to block the rear end of the cylindrical chamber 46.

The iron plates 43 of the magnetic plate assemblies 4 are made from high magnetic conductive materials, for example, silicon steel. The contact areas of the non-magnetic blocks 5 and 6 are covered with a layer of glue. Therefore, when the non-magnetic blocks 5 and 6 and the magnetic plate assemblies 4 are connected together, the connection is firmly secured. The non-magnetic blocks 5 and 6 are preferably made from aluminum.

Figure 5:
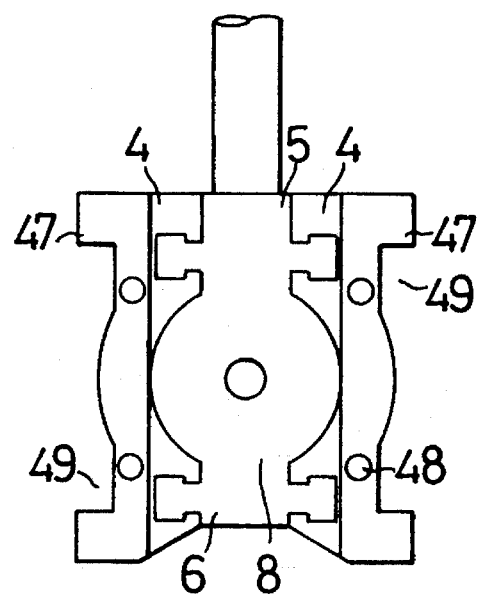
FIG. 5 is a back side view of an alternate form of the present invention.

FIG. 5 shows an alternate form of the present invention, in which tile iron plates 43 of tile magnetic plate assemblies 4 have a respective recessed outer side 49. This arrangement greatly saves the material of the magnetic base, and reduces its weight. Furthermore, the non-magnetic blocks 5 and 6 of this alternate form are injection-molded from plastics.

I claim:

1. A magnetic base comprising: two symmetrical magnetic plate assemblies, each having a circularly arched inner side and a downwardly protruded bottom contact portion; two non-magnetic blocks connected between said symmetrical magnetic plate assemblies at different elevations; a trapezoidal magnetic element turned about an axis to control the magnetic flux between the downwardly protruded bottom contact portions of said symmetrical magnetic plate assemblies and the object been attracted; a non-magnetic front cover and a non-magnetic back cover respectively fastened to said symmetrical magnetic plate assemblies at two opposite sides, wherein:

each magnetic plate assembly is comprised of a stack of iron plates disposed perpendicular to the axis about which said rotary magnetic element is turned, each iron plate comprising two notches at one side near two opposite ends, a flange at each notch, and a plurality of locating holes for the insertion of locating pins to fasten the iron plates of each magnetic plate assembly in a stack;

each non-magnetic block comprises a circularly arched inner side, which defines with the circularly arched inner sides of said magnetic plate assemblies a cylindrical chamber, which holds said rotary magnetic element, and two opposite projecting portions respectively fitted into the respective notches of the iron plates of said magnetic plate assemblies and engaged with the respective flanges.

2. The magnetic base of claim 1 wherein two locating plates of thickness thicker than that of said iron plates are respectively fastened to said magnetic plate assemblies at a back side, each locating plate having a plurality of countersunk holes fastened to the locating holes of said magnetic plate assemblies.

3. The magnetic base of claim 1 wherein said non-magnetic front cover has a plurality of locating rods perpendicularly raised from one side and respectively fastened to the locating holes of the iron plates of said magnetic plate assembly.

4. The magnetic base of claim 1 wherein the iron plates of said magnetic plate assemblies are made from silicon steel.

5. The magnetic base claim 1 wherein said non-magnetic blocks and said non-magnetic back cover are respectively made from aluminum.

6. The magnetic base of claim 1 wherein the iron plates of said magnetic plate assemblies have a respective recessed outer side.

7. The magnetic base of claim 1 wherein said non-magnetic blocks and said non-magnetic back cover are respectively injection-molded from plastics.

* * * * *